Dec. 29, 1959  A. C. WIDEBURG ET AL  2,919,051
BREAD DISPENSER
Filed Dec. 13, 1956  4 Sheets-Sheet 2
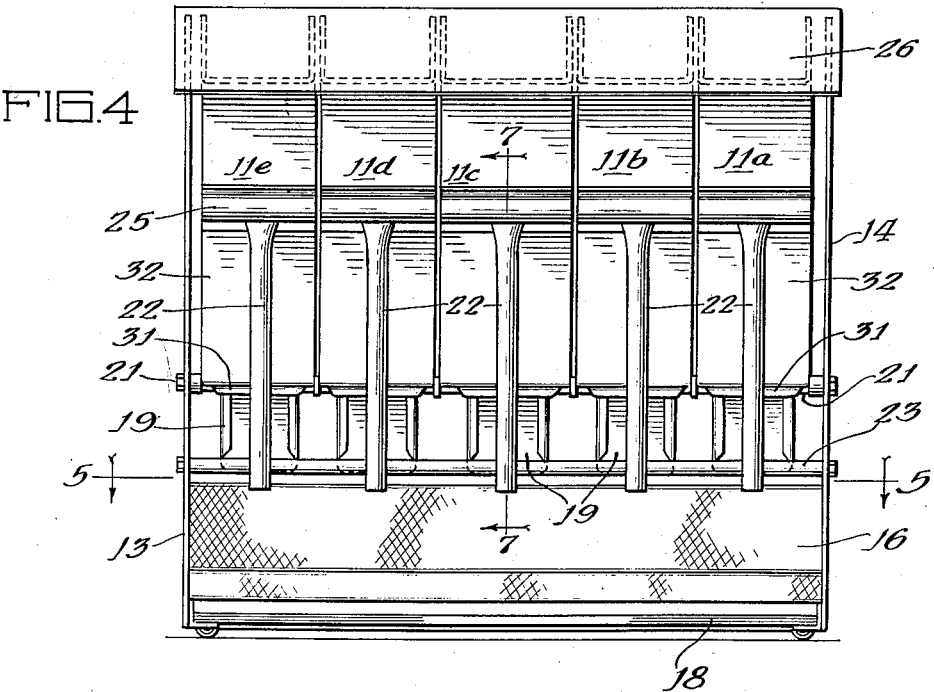
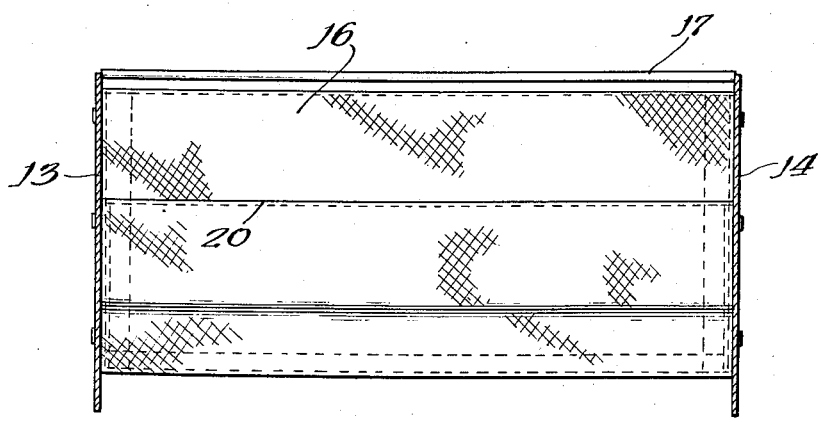
Inventors:
Allen C. Wideburg
Curt C. Wideburg
By: Schrader, Hofgren,
Brady & Wegner
Attorneys Dec. 29, 1959 A. C. WIDEBURG ET AL 2,919,051
BREAD DISPENSER
Filed Dec. 13, 1956 4 Sheets-Sheet 3
FIG. 6
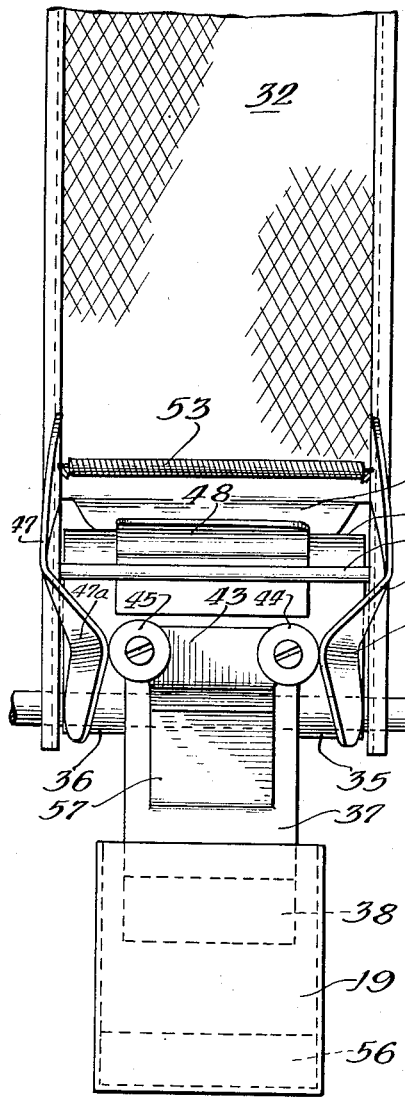
FIG. 7
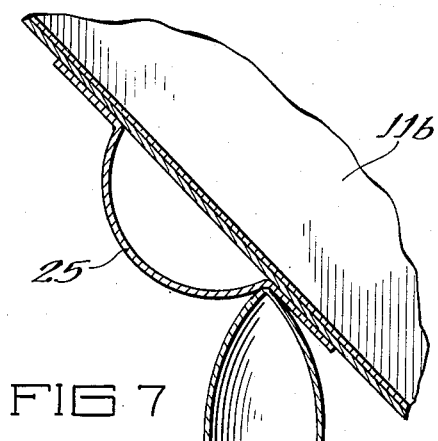
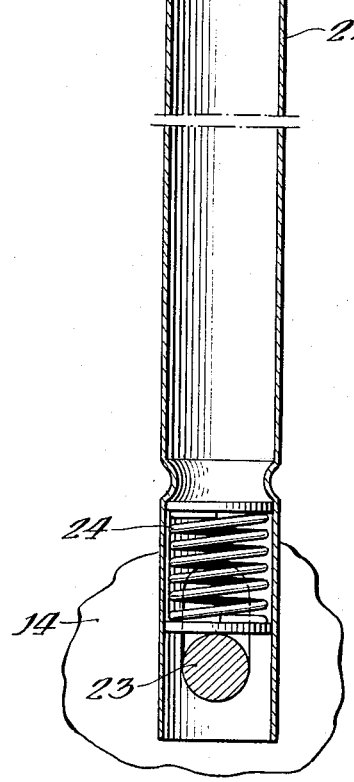
Inventors:
Allen C. Wideburg
Curt C. Wideburg
By Schroder, Hofgren,
Brady & Wegner
Attorneys

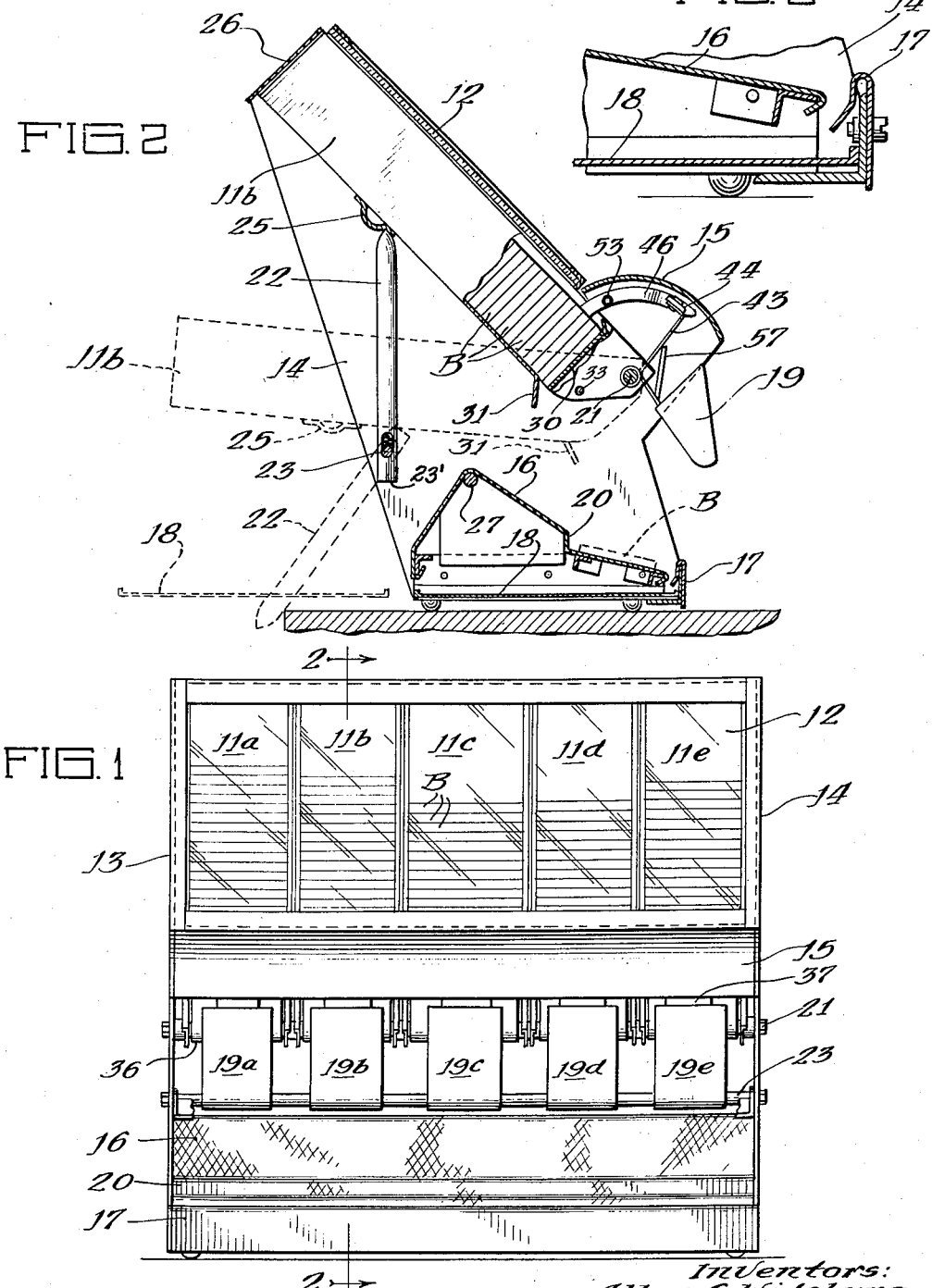

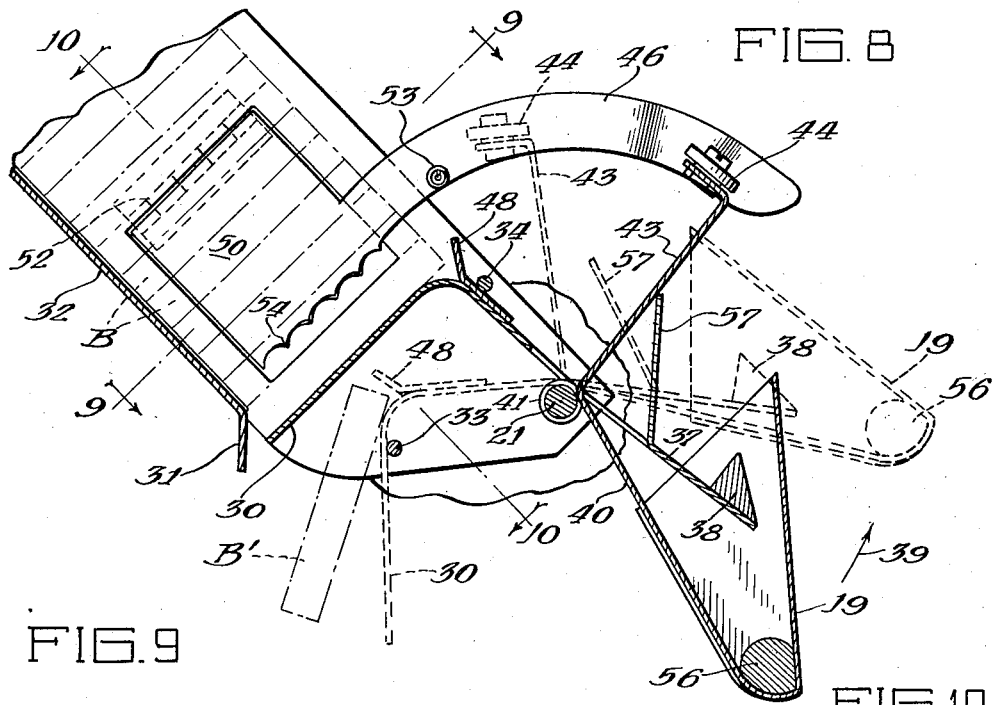
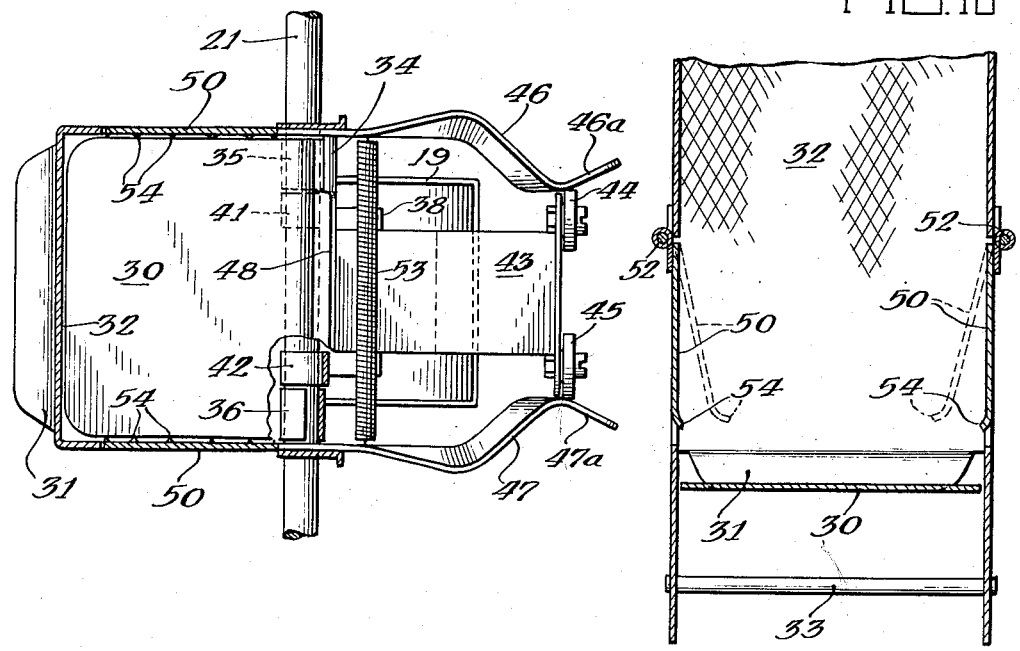

United States Patent Office 2,919,051
Patented Dec. 29, 1959

2,919,051

BREAD DISPENSER

Allen C. Wideburg and Curt C. Wideburg, Chicago, Ill.

Application December 13, 1956, Serial No. 628,177

11 Claims. (Cl. 221—131)

This invention relates to a dispenser for sliced bread.

In some public eating places such as cafeterias, bread is displayed for selective taking by the patrons. It is desirable that the bread be kept fresh by maintaining it out of open air contact and also desirable that the bread be maintained in a sanitary container until selected by a customer. The bread dispenser of this invention achieves all of these desirable features as well as providing a mechanical structure for dispensing the bread, a slice at a time infallibly. In addition to cafeterias, many kitchens of restaurants and other public eating places may use the dispenser primarily for the waiters and waitresses.

The primary object of the invention is to provide a new and improved dispenser for sliced bread.

Another object is to provide a bread dispensing mechanism which may positively dispense one slice of bread at a time without regard to the condition of the bread itself.

Another object is to provide a dispenser which will operate satisfactorily and continuously even though the slices fed to the mechanism are irregularly stacked in loaf form.

Another object is to provide a dispensing mechanism capable of holding a stack of slices leaving the foremost slice free for dispensing from a loaf of such slices.

Another object is to provide a sliced bread dispenser which dispenses bread by dropping a slice at a time by gravity to an open platform accessible from both the front and rear of the dispenser.

A further object is to provide a dispensing mechanism for bread which is easily cleaned, serviced and maintained.

Other objects, features and advantages of the invention will be apparent from the following description of a preferred embodiment illustrated in the accompanying drawings in which:

Figure 1 is a front elevational view of the dispenser;

Figure 2 is a side elevational view in section taken substantially along line 2—2 in Figure 1 through the dispenser;

Figure 3 is a fragmentary enlarged view of the front lower portion of the dispenser;

Figure 4 is a rear elevational view of the dispenser;

Figure 5 is a horizontal sectional view along line 5—5 in Figure 4;

Figure 6 is a fragmentary enlarged plan view of one dispensing chute and its mechanism;

Figure 7 is a fragmentary sectional view through one of the supports for a bread dispensing chute;

Figure 8 is a fragmentary sectional view taken longitudinally of the chute in Figure 6 illustrating positions of the mechanism;

Figure 9 is a fragmentary sectional view of the mechanism taken along line 9—9 of Figure 8; and Figure 10 is a view similar to Figure 9 taken along line 10—10 of Figure 8.

Generally, the bread dispensing mechanism includes a cabinet in which there is placed a number of elongated, U-shaped bread receiving chutes each capable of receiving a loaf of sliced bread. The chutes are generally disposed at a 45° angle for dispensing the bread so that the slices move toward the lower end of the chute by gravity. A door mechanism across the lower end of the chute is easily operated by a lifting handle so that a slice at a time will drop to the receiving shelf.

The particular dispenser illustrated in Figs. 1–4 is one employing five chutes 11a–11e visible through a glass front 12 supported in side panels 13 and 14 of the cabinet joined together on the front by an arcuate hood member 15 covering the main portion of door operating mechanisms associated with each chute. A lower bread receiving and dispensing shelf 16 extends between the side panels, the front being covered by a decorative cover 17 also hiding a crumb receiving tray 18 removable rearwardly from the cabinet for removing bread crumbs from the mechanism. The cabinet is open above the shelf 16 so that a person may reach below the handles 19a–19e to pick up a slice of bread such as B illustrated in Figure 2 from the receiving shelf. The angle of the chutes insures that the slices of bread are fed to the front and the shelf 16 is formed with a step 20, the slices hitting the upper portion and sliding to the lower portion so that sucessively dispensed slices may be superposed. It should be noted in Figure 1 that the chute 11c is larger in width than the others for the purpose of receiving a loaf of bread in which the slices are quite wide as is common with rye. Any number of chutes, of course, may be provided as desired.

The individual bread dispensing chutes are hinged in the cabinet upon a rod 21 extending between and fastened to the side walls 13 and 14. In Figure 2 a chute 11b is shown in full lines as below the glass 12 in dispensing position and as lowered to a dotted line position for loading. A prop-bar 22 is pivotally mounted on a rod 23 similar to rod 21 and spring pressed upwardly by compression spring 24 so as to rest under a half cylindrical enlargement 25 on the lower surface of the chute holding the chute in its upper bread dispensing position. A simple pulling of the prop-bar out from under the enlargement allows the chute to swing downwardly to rest on the rear end 23' of the prop bar and an operator can easily do this with a one hand operation. Similar prop-bars 22 are provided, one for each chute, as seen in Figure 4 so that the chutes may individually be lowered for loading or inspection as to the amount of bread in a particular chute. In its upper position the top 26 encloses the upper end of the chute which normally is otherwise open.

The material of which the cabinet, the bread chutes and all of the mechanism is made is either stainless steel or plated metal or glass, all of which may be easily cleaned and maintained sanitary at all times. The parts of the cabinet are easily reached for cleaning. The supports for the shelf 16 include rods such as 27 placed under the shelf out of any possibility of contact with the bread. The crumb tray 18 in the bottom of the unit is removable for cleaning. Obviously the glass and all parts of the cabinet are easily accessible as well.

Each U-shaped dispensing chute is normally open at both ends and when in dispensing position is closed at its lower end by a door 30 spaced slightly from a lowered lip 31 on the bottom 32 of each chute with the spacing being such that a slice of bread will not fall through. The door 30 is movable between a pair of stop pins 33 and 34 fastened in the sides of each chute. The door itself is secured by rounded extensions 35 and 36 forming pintle bearings about the rod 21. An extension 37 of the door is provided with a weight 38 within a handle 19 which is exposed for operation by a bread customer. In Figure 8 the door 30 is shown in closed position in its full line representation. The handle 19 may be moved in the direction of the arrow 39 to a dotted line position also illustrated for moving the door to its dotted line position allowing the slice of bread B' to drop from the chute by gravity. The handle 19 has an extension 40 having rounded portions 41 and 42 acting as pintle bearings for the handle on the rod 21 and an upwardly extending tongue 43 integral with the part 40 and carrying a pair of cam followers 44 and 45. As the handle 19 is first raised the cam followers move relative to a pair of ears 46 and 47 operating grippers for retaining bread within the chutes.

The operation of lifting handle 19 causes a timed operation of grippers for retaining bread within the chutes and thereafter opening the door to dispense a slice of bread. The first upward movement allows the handle 19 to move relative to the door mechanism 30. As the extension parts 37 and 40 come into contact the door will also be moved. The movement in any instance is limited by the stop pins 33 and 34. Should a slice of bread adhere by surface tension to the slices remaining in the chute, a small plate 48 on the top of the door will push the first slice out of the chute.

The gripping mechanism referred to includes a pair of gripping plate 50, each provided with a hinge 52 connecting it to the side of the chute. The upwardly extending arms such as 46 are integral with the gripping plates and are provided with curved portions cooperating with the cam followers 44 and 45. In the full line position of Figure 8 the curved portions 46a and 47a of the arms bear inwardly on the followers stretching tension spring 53 between them holding the grippers in the plane of the sides of the chute. The follower and cam arms cooperatively lock the door in closed position. As the cam followers move on the outwardly extending portions of the cams, the gripper plates are allowed to move toward each other under action of the spring and thus grip against bread within the chute. A serrated front edge 54 on the plates aids in gripping the next to the foremost slice. As will be noted from the dotted line position of the grippers in Figure 10, several slices of bread back of the foremost may actually be contacted.

When a slice of bread is dispensed from a chute by moving the handle to the dotted line position of Figure 8, the handle may simply be released for return to its full line position under action of gravity aided by a weight 56 in the handle and the door will be closed by action of the weight 38. An integral tongue 57 on the door mechanism engages the tongue 43 and thus will insure the locking of the door in closed position against the handle structure. In operation any lifting of the handle will first allow the gripper plates to move against and hold all but the foremost slice of bread in the chute. Continued movement will open the door and dispense the foremost slice. The gripping mechanism works equally well where the slices are neatly and evenly placed in the chute or where they are placed in a random hit or miss fashion. The lower surface or bottom 32 of each chute is formed with a rigidized metal which provides a dimple-like irregular surface over which the bread slides much more easily than a flat surface. The receiving platform 16 is formed of a similar metal. While the angle of 45° of the chutes in dispensing position may be varied to some extent, it has been found to operate quite satisfactorily as to the gravity feeding of the bread and the retention of all but the foremost slices in place upon opening of the front dispensing door.

The foregoing detailed description has been given for clearness of understanding only and no unnecessary limitations should be understood therefrom as some modifications will be obvious to those skilled in the art.

We claim:
1. A sliced bread dispenser, comprising: a cabinet; a bread chute in the cabinet shaped to receive a plurality of bread slices arranged generally in loaf fashion for dispensing delivery out of one end of the chute; a door swingably mounted across the dispensing end of the chute; a pair of gripper plates pivotally mounted in opposite sides of the chute adjacent the dispensing end for moving toward each other gripping the bread slices adjacent the foremost slice, said gripper plates having upwardly extending cam arms and spring means urging the arms together; a dispenser operating handle pivotally mounted in the cabinet and carrying a cam follower holding said cam arms apart when the door is closed; and said door having an operating lever with a lost motion connection with said operating handle permitting movement of the grippers prior to opening of the door in response to manual actuation of dispenser handle.

2. A bread dispenser, comprising: a cabinet having a lower exposed bread receiving shelf sloping toward the front of the dispenser; a plurality of bread chutes in the cabinet above the shelf and extending upwardly and rearwardly, each chute being shaped to receive a loaf of sliced bread for dispensing delivery out of the lower end of the chute; a door across the lower end of each chute and an operating handle for opening the door at will, said handles being pivotally mounted for upward lifting movement to operate the door and said shelf having a step therein of a height greater than a bread slice thickness with the upper portion being raised for superposing a pair of dispensed slices, said chutes being positioned to drop a slice of bread upon the upper portion of said shelf for sliding to the front of the shelf.

3. A sliced bread dispenser, comprising: a rearwardly open cabinet having an exposed bread receiving lower shelf; a rod secured in the cabinet above the shelf; an elongated bread chute swingably secured adjacent its dispensing and on said rod and in the cabinet, said chute being upwardly open and generally U-shaped in section to receive a plurality of bread slices arranged in loaf fashion and extending upwardly above the shelf in bread dispensing position; a door across the lower end of the chute and a manually operable handle connected to the door for selectively opening and closing the door to dispense the bread slices by gravity drop to said shelf, said chute carrying limit means restricting swinging of the door relative to the chute; and said chute and door being swingable from said bread dispensing position to a generally horizontal bread loading position, said cabinet having a front closing the open side of the chute when in dispensing position.

4. A sliced bread dispenser, comprising: a cabinet; a bread chute in the cabinet shaped to receive a plurality of bread slices arranged generally in loaf fashion for dispensing delivery out of one end of the chute; a door swingably mounted across the dispensing end of the chute; a pair of gripper plates pivotally mounted in opposite sides of the chute adjacent the dispensing end for moving toward each other gripping the bread slices adjacent the foremost slice, said gripper plates having upwardly extending cam arms and spring means urging the arms together; a dispenser operating handle pivotally mounted in the cabinet and carrying a cam follower yieldingly urged to a position holding said cam arms apart when the door is closed; spaced stops on said chute for limiting movement of said door; said door having an operating lever with a lost motion connection with said operating handle permitting movement of the grippers prior to opening of the door in response to manual actuation of dispenser handle, said cabinet having a rod supporting each of said door operating lever, dispenser handle and bread chute.

5. A sliced bread dispenser, comprising: a cabinet having a bread receiving shelf open to the front of the dispenser; a plurality of upwardly and rearwardly extending chutes mounted in the cabinet each having a lower dispensing end spaced above the shelf so as to permit manual removal of dispensed bread slices from the shelf, each chute being shaped to receive a plurality of bread slices arranged in loaf fashion; a door across the lower end of each chute and a manually operable handle connected to each door for selectively opening and closing the door to dispense the bread slices by gravity drop through the space from the chute to said shelf; a pair of opposed gripper plates pivotally movable inwardly of each chute to grasp and hold bread slices beyond the foremost; spring means urging said plates inwardly of the chute and cam means between said handle and gripper plates for operating said gripper plates in timed relation to opening and closing of said door.

6. A sliced bread dispenser, comprising: a cabinet; a bread chute mounted in the cabinet and shaped to receive a plurality of bread slices arranged in loaf fashion, said chute being positioned for gravity movement of the bread toward one end; a swingably mounted door closing said one end of the chute; opposed grippers adjacent said one end of the chute movable toward each other against slices of bread in the chute next to the foremost slice for holding all but the foremost slice in the chute prior to opening movement of said door; and manual operating handle means arranged in alignment with the bread chute and including a lever swingably mounted in said cabinet for manual movement to dispense a bread slice, said lever having means for operating the grippers upon initial movement thereof and a lost motion connection with said door for opening the latter following said initial movement.

7. A sliced bread dispenser, comprising: a cabinet; a bread chute mounted in the cabinet and shaped to receive a plurality of bread slices arranged in loaf fashion, said chute being held in the cabinet at about 45° to horizontal in dispensing position for gravity movement of the bread toward one end; a swingably mounted door closing said one end of the chute; opposed grippers adjacent said one end of the chute movable toward each other against slices of bread in the chute next to the foremost slice for holding all but the foremost slice in the chute prior to opening movement of said door; and manual operating handle means arranged in alignment with the bread chute and having means for moving said grippers and door in timed relation.

8. A sliced bread dispenser, comprising: a cabinet; a bread chute mounted in the cabinet and shaped to receive a plurality of bread slices arranged in loaf fashion, said chute being positioned for gravity movement of the bread toward one end; a swingably mounted door closing said one end of the chute said door being provided with a pivot support spaced forwardly of the end of the chute so that initial movement of the swinging door is across the chute opening; a finger on said door for pushing the foremost slice out of the chute against surface tension thereof with remaining slices; opposed grippers adjacent said one end of the chute movable toward each other against slices of bread in the chute next to the foremost slice for holding all but the foremost slice in the chute prior to opening movement of said door; and manual operating handle means arranged in alignment with the bread chute and having means for moving said grippers and door in timed relation.

9. A sliced bread dispenser, comprising: a cabinet having a bread receiving shelf in the lower portion thereof, said shelf being shaped to receive and retain a dispensed bread slice thereon and being open to the front and rear of the cabinet throughout its width for manual removal of bread slices dispensed thereto; a plurality of upwardly and rearwardly extending chutes mounted in the cabinet above and in spaced relation to said shelf, each chute having a lower dispensing end spaced above the shelf a distance to permit unobstructed insertion of a person's hand to remove a dispensed bread slice from the shelf, each chute being shaped to receive and enclose a plurality of bread slices arranged in loaf fashion; a door across the lower end of each chute and a manually operable handle exposed at the front of said cabinet and connected to each door for selectively opening and closing said door to dispense a bread slice by free gravity drop through said space removing the dispensed bread slice from the supply in said chute to an exposed, accessible position upon said lower receiving shelf.

10. A sliced bread dispenser, comprising: a rearwardly open cabinet having an exposed bread receiving lower shelf; an elongated bread chute swingably secured adjacent its lower end in the cabinet in spaced relation above said lower shelf, said chute being upwardly open and generally U-shaped in section to receive a plurality of bread slices arranged in loaf fashion and extending upwardly and rearwardly above the shelf in bread dispensing position, said cabinet having a support for supporting the chute generally horizontal when swung downwardly for loading; a door across the lower end of the chute and a manually operable handle connected to the door for selectively opening and closing the door to dispense the bread slices by gravity drop through the space from said chute to said shelf; and said chute and door being swingable together from said bread dispensing position to a generally horizontal bread loading position, said cabinet having a front panel in position for closing the open side of the chute when in dispensing position.

11. A bread dispenser as specified in claim 10 wherein the chute is pivoted adjacent its dispensing end on a front rod secured in the cabinet and a prop-bar is pivotally and slidably mounted on a rear rod in the cabinet spaced from the front rod, said prop-bar being yieldably urged upwardly for holding the chute in dispensing position in the cabinet and readily releasable from the chute and pivotable away from holding position to permit swinging of the chute to loading position.

References Cited in the file of this patent

UNITED STATES PATENTS

| | | |
|---|---|---|
| 863,743 | McLouth | Aug. 20, 1907 |
| 1,330,639 | Leumann | Feb. 10, 1920 |
| 1,400,814 | Grover | Dec. 20, 1921 |
| 1,969,170 | Erickson | Aug. 7, 1934 |
| 2,342,452 | Casteen | Feb. 22, 1944 |